Dec. 28, 1926.
E. W. SEEGER
1,612,063
POWER DISTRIBUTION SYSTEM
Filed Sept. 24, 1923     3 Sheets-Sheet 2
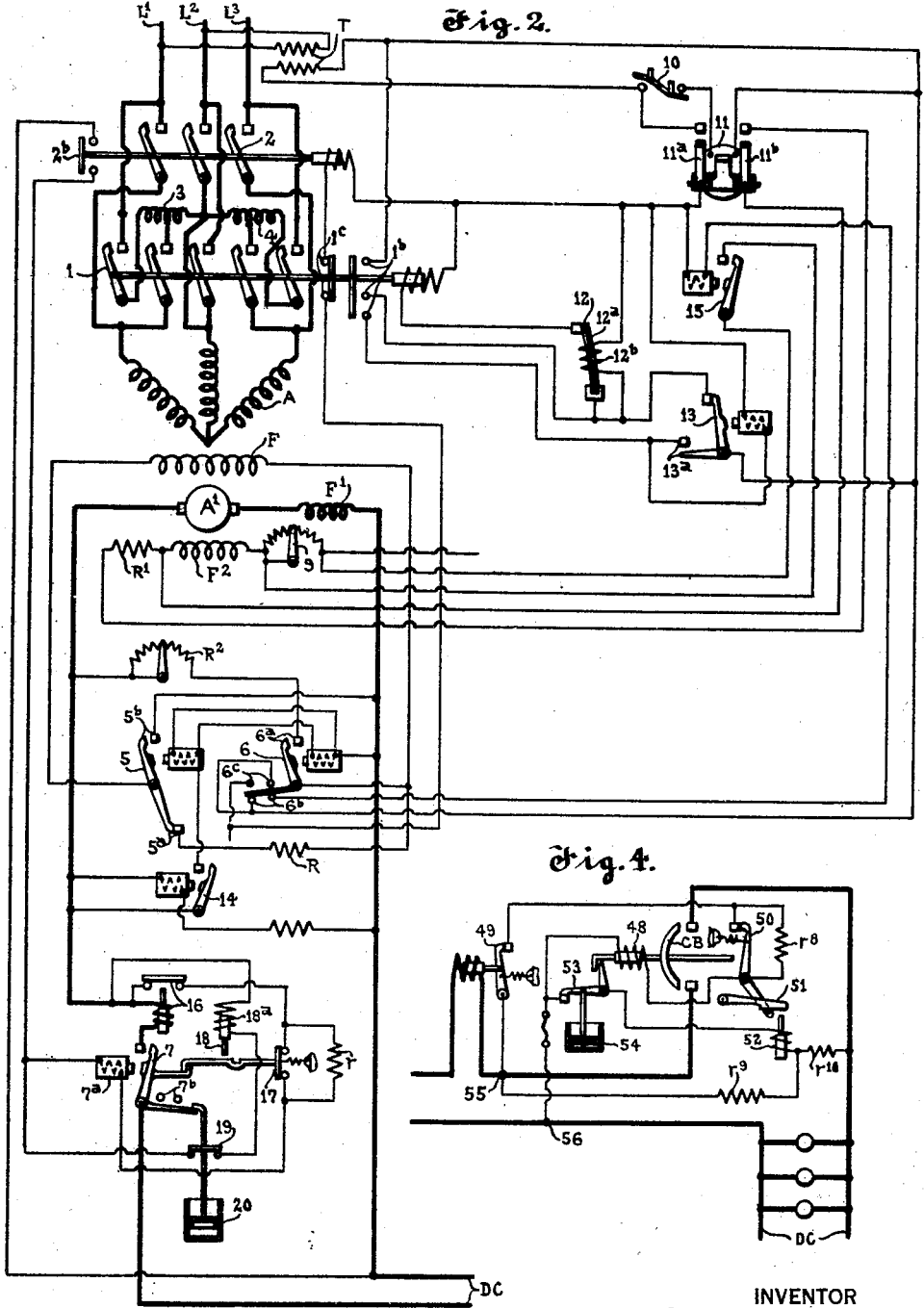
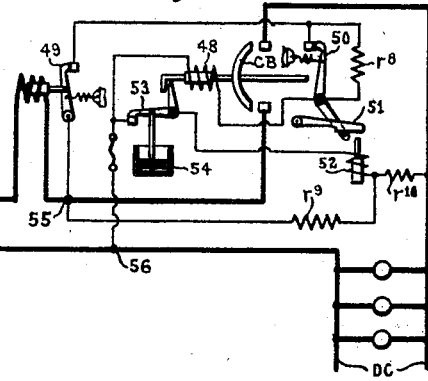
INVENTOR
Edwin W. Seeger
BY
Franks W Hubbard
ATTORNEY

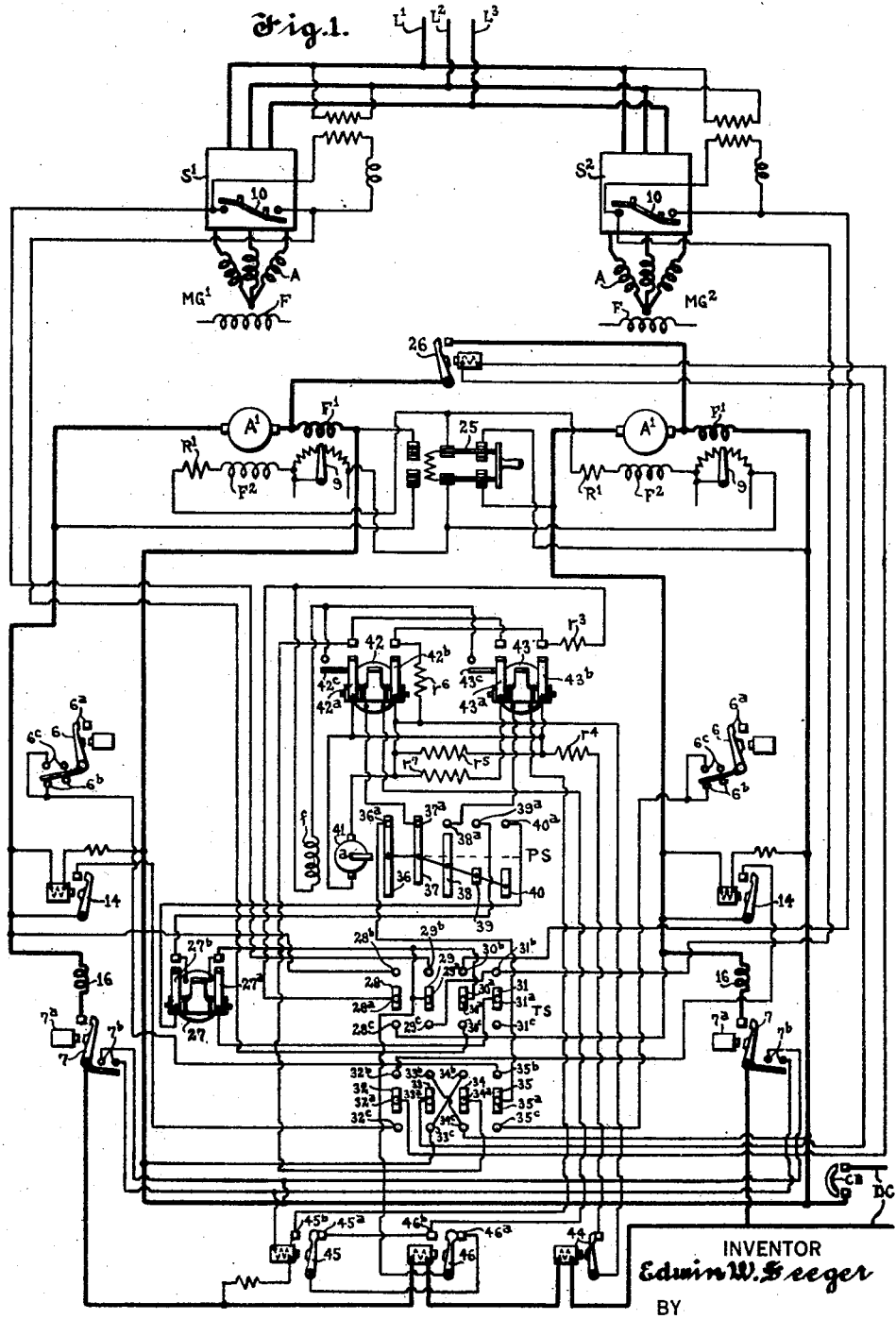

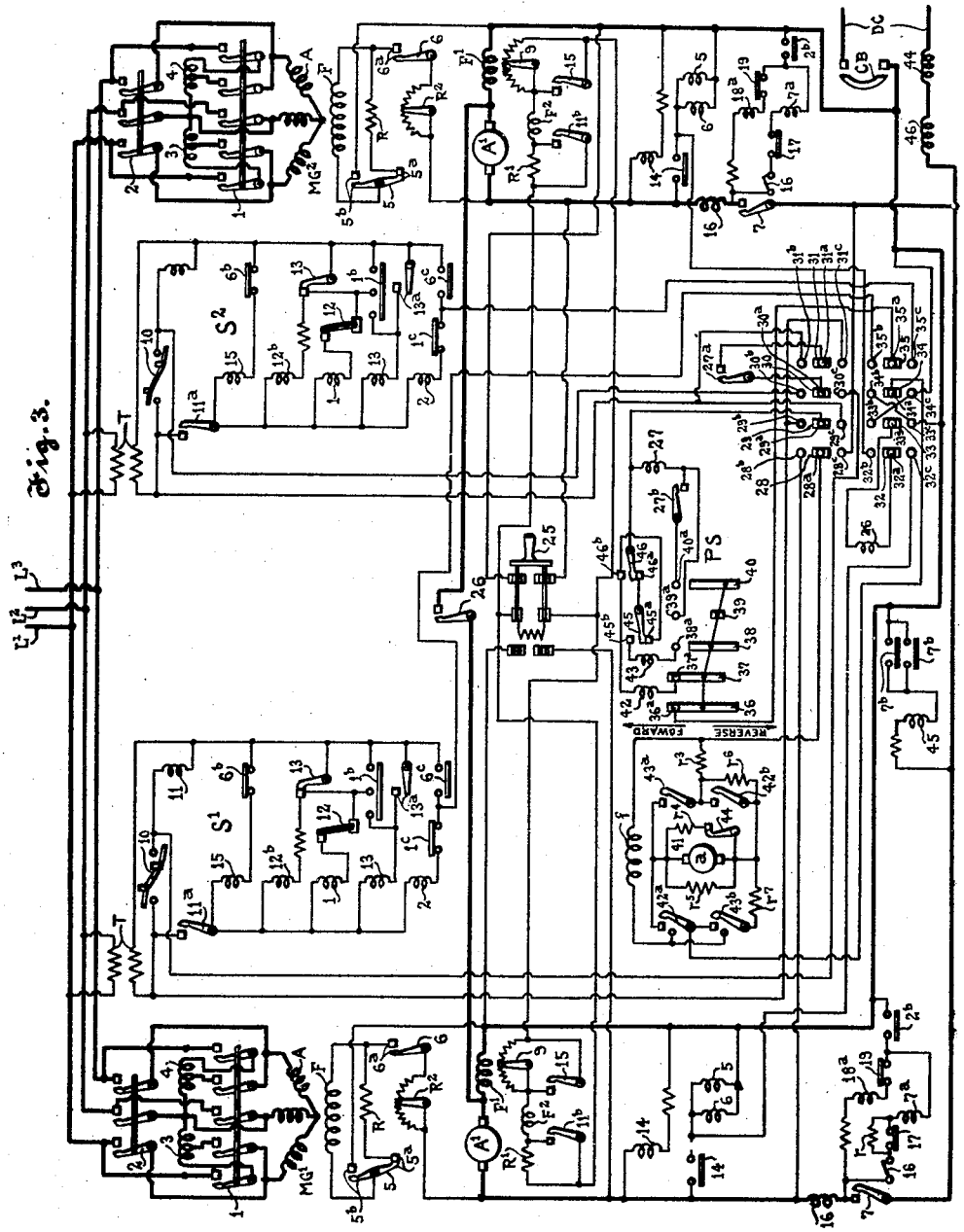

Patented Dec. 28, 1926.   BEST AVAILABLE COPY   1,612,063

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

POWER-DISTRIBUTION SYSTEM.

Application filed September 24, 1923. Serial No. 664,468.

This invention relates to power distribution systems.

The invention is particularly applicable to automatic substations including two rotary transformer units either to supply a distribution circuit under light load conditions and the other to operate in parallel with the former under heavier load conditions.

The present invention has among its objects to provide an improved automatic controller for substations of the aforesaid character.

Another object is to provide an automatic controller for substations of the aforesaid character including separate automatic starters for each of the units and automatic means for starting and stopping either of the units while the other is in operation upon given load conditions in the distribution circuit.

Another object is to provide an automatic controller of the aforesaid character adapted when either of the units is in operation to start the other of the units upon a lapse of time variable inversely to the value of the load.

Another object is to provide for equalization of the voltage of the two units when the same are thrown in parallel across the distribution circuit.

Another object is to provide an automatic controller of the aforesaid character including means whereby either machine when operating alone will be disconnected from the load circuit automatically when its load becomes excessive and whereby the other machine will then be started and both machines connected to the load circuit.

Another object is to insure against simultaneous starting of the units after voltage in the supply circuit fails and is restored.

Various other objects and advantages of the invention will hereinafter appear.

The accompanying drawings illustrate an embodiment of the invention which will now be described, it being understood that certain features of the invention are not limited to substations of the character shown and that the controller can be modified in certain respects without departing from the scope of the appended claims.

In the drawings:

Figure 1 is a diagrammatic view of a controller embodying the invention.

Fig. 2 is a diagrammatic view of one of the automatic starters shown in Fig. 1.

Fig. 3 is a so-called across-the-line diagram of the preferred circuit connections, and Fig. 4 is a diagrammatic view of an automatic reclosing circuit breaker which is employed in the distribution circuit.

Referring to Fig. 1, the same illustrates an automatic substation including two motor generator sets $MG^1$ and $MG^2$, a three phrase alternating current supply circuit indicated by lines $L'$, $L^2$, $L^3$ and a distribution circuit indicated by lines DC. The motor generator sets each include a motor having an armature A and a field F and a generator having an armature $A'$, a series field $F'$ and a shunt field $F^2$. The motor generator sets $MG^1$ and $MG^2$ are adapted to be started selectively by automatic starters $S^1$ and $S^2$, and, as hereinafter set forth, automatic control means is provided between said starters which is adapted to start either of the motor generator sets while the other is in operation upon given load conditions in the distribution circuit.

Also, as hereinafter set forth, an automatic reclosing circuit breaker CB is provided for disconnecting both of the motor generator sets from the distribution circuit DC upon no voltage or given overload conditions in said circuit.

The automatic starters are of like construction and as shown in Fig. 2 each of the same includes a five pole electromagnetic starting switch 1 and a three pole electromagnetic running switch 2, the former switch being adapted to establish low voltage connections from lines $L'$, $L^2$, $L^3$ to armature A through the medium of compensator windings 3 and 4 and the latter being adapted to connect said armature directly to said lines. The field F of the motor is controlled by electromagnetic switches 5 and 6 the former switch having normally closed contacts $5^a$ and normally open contacts $5^b$ and the latter having normally open contacts $6^a$. Contacts $5^a$ are adapted to short-circuit the field F of the motor through a discharge resistance R and the contacts $5^b$ and $6^a$ are connected in series and are adapted to connect said field across the terminals of the generator. An automatic reclosing circuit breaker 7, which will be hereinafter more fully described, is provided for connecting the generator to the distribution circuit DC and as hereinafter set forth, means is provided for connecting the fields F² of the motor generator sets in parallel across the terminals of the leading generator. Each of the shunt fields has included in circuit therewith a resistance R' and a regulating rheostat 9.

The automatic control means includes a master switch 10 which controls the energizing circuit of a double pole electromagnetic switch 11. Starting switch 1 is controlled by the left hand pole 11ª of switch 11 through the medium of a normally closed electrothermally responsive timing switch 12 and a normally closed electromagnetic relay 13, and as hereinafter set forth, said starting switch is provided with normally open auxiliary contacts 1ᵇ for controlling its energizing circuit and for also controlling the energizing circuit of relay 13. Timing device 12 can be of any suitable type and as shown the same includes a bi-metallic contact strip 12ª having a heating coil 12ᵇ associated therewith. Relay 13 is provided with auxiliary contacts 13ª and upon response of said relay said contacts maintain the same in closed position as hereinafter set forth. Field switches 5 and 6 are controlled by a normally open voltage relay 14 connected across the terminals of the generator and the field switch 6 has associated therewith normally closed auxiliary contacts 6ᵇ for controlling the energizing circuit of a relay 15, and normally open contacts 6ᶜ for establishing an energizing circuit for the running switch through the medium of switch 11 and normally closed contacts 1ᶜ associated with starting switch 1. Relay 15 is adapted to shunt the regulating rheostat 9 in the shunt field circuit F² and the resistance R' in said field circuit is adapted to be shunted by the right hand pole 11ᵇ of switch 11.

The automatic reclosing circuit breaker 7 has a closing coil 7ª associated therewith the energizing circuit of said coil being controlled by an overload relay 16, a normally closed auxiliary switch 17 and a normally open auxiliary switch 2ᵇ associated with running switch 2. Switch 17 normally shunts a resistance r in the energizing circuit of coil 7ª and upon closure of the circuit breaker the same is moved to open position and is adapted to be held therein by an electromagnetic latching device 18. Latching device 18 is releasable by and operating winding 18ª, which is controlled by auxiliary switch 2ᵇ and a normally closed auxiliary switch 19 associated with circuit breaker 7. Switch 19 is adapted to be moved to open position upon closure of the circuit breaker and upon opening of the circuit breaker the same is adapted to return to closed position against the action of a dash pot 20.

The function and operation of the aforedescribed starter together with the circuit connections therefor will now be more fully set forth in connection with Fig. 3. Assume that the master switch of either of the starters is moved to closed position upon closure of said switch the operating winding of switch 11 is connected across the terminals of a transformer T supplied with current from lines L' L² of the supply circuit. Switch 11 then closes and it will be observed from Figure 3 that the left hand pole 11ª thereof connects the left hand terminal of transformer T to the operating windings of starting and running switches 1 and 2, and also to the operating windings of relays 13 and 15 and heating coil 12ᵇ. It will also be observed that the right hand pole 11ᵇ of switch 11 short-circuits the resistance R' in the shunt field circuit of the generator. Immediately upon closure of switch 11 the operating winding of starting switch 1 is connected to the right hand terminal of transformer T through timing switch 12 and relay 13 while the operating winding of relay 15 is connected to the right hand terminal of said transformer through auxiliary contacts 6ᵇ associated with field switch 6. Starting switch 1 and relay 15 thus respond immediately upon closure of switch 11 and the former in responding establishes low voltage connections from lines L' L² L³ through compensator windings 3 and 4 to armature A, such connections being apparent from the drawing, and the latter in responding shortcircuits the regulating rheostat 9 in the shunt field circuit of the generator. Also it will be observed from Fig. 3 that upon response of starting switch 1 the auxiliary contacts 1ᵇ thereof establish a circuit from the right hand terminal of transformer T through timing switch to the operating winding of starting switch 1 and also from the right hand terminal of said transformer to the operating winding of relay 13. Relay 13 thus responds and the auxiliary contacts 13ª thereof establish a maintaining circuit therefor from the right hand terminal of transformer T.

Upon establishment of the aforementioned starting connections the motor will be brought up to speed the field thereof being short-circuited through resistance R by contacts 5ª of field switch 5. Assuming that the shunt field F² of the generator is connected across the generator terminals and it will be observed that due to exclusion of the resistance R' and rheostat 9, as above set forth, the voltage of the generator will build up quickly. The operating winding of voltage relay 14 is connected across the terminals of the generator and when the generator voltage reaches a predetermined value said relay responds and it is apparent from Fig. 3 that upon response thereof the operating windings of field switches 5 and 6 are connected in parallel across the generator terminals. Field switches 5 and 6 then respond and it will be observed from Fig. 3 that the same connect the field F of the generator motor across the terminals of the generator through regulating rheostat $R^2$. Also, upon response of field switch 6 the auxiliary contacts $6^b$ thereof interrupt the energizing circuit of relay 15 and said relay in opening inserts the regulating rheostat 9 in the shunt field circuit of the generator. Following response of field switches 5 and 6 the timing relay 12 responds to interrupt the energizing circuit of the operating winding of starting switch 1 and upon opening of said starting switch the operating winding of running switch 2 is connected to the right hand terminal of transformer T through auxiliary contacts $1^c$ of starting switch 1 and auxiliary contacts $6^c$ of field switch 6. Running switch 2 then responds to connect the motor armature A directly to lines $L^1$, $L^2$ and $L^3$ and upon closure of said running switch it is apparent from Fig. 3 that the closing coil $7^a$ of circuit breaker 7 is connected across the generator terminals through overload relay 16, auxiliary switch 17 and auxiliary contacts $2^b$ of said running switch. Circuit breaker 7 in closing connects the generator to the distribution circuit DC and upon closure of said circuit breaker auxiliary switch 17 inserts the resistance $r$ in the energizing circuit of winding $7^a$. Also upon closure of circuit breaker 7 auxiliary switch 19 is moved to open position and the latching device 18 then serves to lock switch 17 in open position. When the load on the generator is of a predetermined value relay 16 responds to interrupt the energizing circuit of closing coil $7^a$ and upon opening of the circuit breaker, switch 17 is held in open position by latching device 18. However, after a given period switch 19 returns to closed position against the action of dash pot 20 and upon closure of said switch winding $18^a$ is connected across the terminals of the generator through contacts $2^b$ associated with running switch 2. The latching device 18 then responds and switch 17 returns to closed position to short-circuit the resistance $r$ and if the overload relay 16 has returned to closed position winding $7^a$ is energized to effect reclosure of the circuit breaker As before stated, means is provided for connecting the shunt fields $F^2$ of the generators in parallel across the terminals of the leading generator, and, as shown in Fig. 1, such means comprises a two pole double throw knife switch 25. It is apparent that with the circuit connections shown in Fig. 1 movement of the knife switch into engagement with its left hand stationary contacts connects the fields $F^2$ in parallel across the terminals of the left hand generator, while movement of the knife switch into engagement with its right hand stationary contacts connects said fields in parallel across the terminals of the right hand generator. Also, as shown in Fig. 1, a switch 26 is provided for establishing an equalizing connection between the generators of the two motor generator sets, such switch being controlled as hereinafter set forth.

The aforementioned automatic control means between starters $S^1$ and $S^2$ includes a double pole electromagnetic switch 27 controlled through the medium of a transfer switch TS and a pilot switch PS. Transfer switch TS comprises a drum having two sets of movable contacts, one including contacts 28 to 31 inclusive and the other including contacts 32 to 35 inclusive and said drum is movable in opposite directions from an intermediate "off" position into extreme "on" position. Contacts 28 to 31 inclusive co-operate with stationary contacts $28^a$ to $31^a$, $28^b$ to $31^b$ and $28^c$ to $31^c$ while contacts 32 to 35 inclusive co-operate with stationary contacts $32^a$ to $35^a$, $32^b$ to $35^b$ and $32^c$ to $35^c$. The pilot switch PS comprises a movable drum having electrically connected contacts 36 to 40 which co-operate with stationary contacts $36^a$ to $40^a$ respectively. Pilot switch PS is adapted to be driven in opposite directions by a motor 41, said motor having an armature "$a$" and a shunt field "$f$". Motor 41 is controlled by a pair of double pole electromagnetic switches 42 and 43, the former switch having a field control contact $42^c$ associated therewith and being adapted to establish power connections for forward operation of the motor and the latter having a contact $43^c$ associated therewith and being adapted to establish reverse power connections for the motor. As hereinafter set forth, the power connections established by switch 42 include resistances $r^3$, $r^4$ and $r^5$, while the power connections established by switch 43 include, in addition to the aforesaid resistances, resistances $r^6$ and $r^7$. Also, as hereinafter set forth, the resistance $r^4$ is adapted to be excluded from the power circuit of the motor by a normally closed relay 44 responsive to given load conditions in the distribution circuit. Switches 42 and 43 are controlled by relays 45 and 46. Relay 45 is controlled by normally open auxiliary contacts $7^b$ associated with each of the circuit breakers 7 and said relay is responsive to voltage in the distribution circuit and includes a contact member normally in engagement with a stationary contact $45^a$ and movable into engagement with a stationary contact member $45^b$. Relay 46 is responsive to given load conditions in the distribution circuit and the same includes a contact member normally in engagement with a stationary contact 46$^a$ and movable into engagement with a stationary contact 46$^b$.

The function and operation of aforedescribed automatic control means will now be more fully set forth in connection with Fig. 3. Assume that the motor generator set MG$^1$ is in operation and that the transfer switch TS is in its upper position. If the load on the distribution circuit is normal circuit breaker 7 of starter S$^1$ is in closed position and it is apparent from Fig. 3 that the contacts 7$^b$ thereof connect the winding of relay 45 across the distribution circuit whereby the movable contact of said relay is held in engagement with its co-operating stationary contacts 45$^b$. Relay 46 responds upon given load conditions in the distribution circuit DC while relay 44 responds upon heavier load conditions. Relay 46 in responding establishes an energizing circuit for switch 42 extending from the left hand terminal of transformer T associated with starter S$^1$ through contacts 29$^b$, 29 and 29$^a$ of the transfer switch through the movable contact and stationary contact 46$^b$ of relay 46 through the operating winding of switch 42 through contacts 37$^a$, 37, 36 and 36$^a$ of the pilot switch through contacts 35$^a$, 35 and 35$^b$ of the transfer switch through auxiliary switch 6$^c$ associated with field switch 6 of starter S$^1$ to the right hand terminal of said transformer. Switch 42 then responds and in responding the same establishes power connections for motor 41 extending from the left hand terminal of the generator of set MG$^1$ through contacts 28$^b$, 28 and 28$^a$ of the transfer switch through resistance $r^3$ and the right hand pole 42$^b$ of switch 42 through armature "$a$" through the left hand pole 42$^a$ of the switch 42 through contacts 34$^a$, 34 and 34$^b$ and 33$^c$ of the transfer switch to the right hand terminal of said generator. It should be observed upon establishment of the aforedescribed power connections, resistances $r^4$ and $r^5$ are connected in parallel across the terminals of the armature "$a$" of motor 41, while the auxiliary contacts 42$^c$ associated with switch 42 connect the field "$f$" of said motor across the terminals of the generator of set MG$^1$. Motor 41 then operates to move the pilot switch in the forward direction indicated in the drawings and after a given period of time contact 39 is brought into engagement with contact 39$^a$ to energize switch 27 by a circuit extending from the left hand terminal of the transformer T associated with starter S$^1$ through contacts 29$^b$, 29 and 29$^a$ of the transfer switch through the operating winding of switch 27 through contacts 39$^a$ and 39 to contact 36$^a$ of the pilot switch through contacts 35$^a$, 35 and 35$^b$ of the transfer switch through auxiliary contacts 6$^c$ of the field switch 6 associated with starter S$^1$ to the right hand terminal of transformer T. In responding switch 27 shunts master switch 10 of starter S$^2$ by a circuit extending from the left hand terminal of said master switch through contacts 31$^b$, 31 and 31$^a$ of the transfer switch through the right hand pole 27$^a$ of switch 27 through contacts 30$^a$, 30 and 30$^b$ of the transfer switch to the right hand terminal of said master switch. Upon shunting of master switch 10 of starter S$^2$ said starter functions in the manner above described to start the motor generator set MG$^2$. Switch 27 in responding is maintained in closed position pending return of the pilot switch to normal position by a circuit extending from the left hand terminal of transformer T associated with starter S$^1$ to and through the winding of switch 27 as already traced through the left hand pole 27$^b$ of switch 27 through contacts 40$^a$ and 40 to contact 36$^a$ and thence to the right hand terminal of said transformer as already traced. As soon as the voltage relay 14 associated with starter S$^2$ responds, switch 26 is energized by a circuit extending from the left hand terminal of the generator associated with set MG$^2$ through said relay through contacts 32$^b$, 32 and 32$^a$ of the transfer switch through the operating winding of said relay and through contacts 33$^a$, 33, 33$^b$ and 34$^c$ of the transfer switch to the right hand terminal of said generator. In responding switch 26 establishes an equalizing connection between the generators which is apparent from the drawings. Immediately upon closure of relay 27 to effect automatic starting of the generator set MG$^2$ contact 37$^a$ of the pilot switch moves out of engagement with contact 37 and the switch 42 is then deenergized to interrupt the power connections of motor 41 for stopping the latter.

As before stated, relay 44 responds at a higher load value than that at which relay 46 responds. Relay 44 in responding excludes the resistance $r^4$ in the energizing circuit of motor 41, and said motor thus operates at a given speed in a forward direction upon given load conditions in the distribution circuit and at a higher speed upon increased load conditions in said circuit whereby the pilot switch PS functions to start the second motor generator set upon a lapse of time variable inversely to the value of the load.

Assume now that the pilot switch PS is in its full forward position or in any intermediate position and that the load on the distribution circuit drops so that relay 46 returns to normal position. Switch 43 will then be energized by a circuit extending from the left hand terminal of the transformer T associated with starter S$^1$ through contacts 29$^b$, 29 and 29$^a$ of the transfer switch through the contact arm and stationary contact 46$^a$ of relay 46 through the contact arm and stationary contact 45$^b$ of relay 45 through the operating winding of switch 43 through contacts 38$^a$ and 38 to contact 36$^a$ of the pilot switch and thence through contacts 35$^a$, 35 and 35$^b$ of the transfer switch and contacts 6$^c$ of the field switch associated with starter S$^1$ to the right hand terminal of transformer T. Closure of switch 43 establishes reverse power connections for motor 41 extending from the left hand terminal of the generator associated with set MG$^1$ through contacts 28$^b$, 28 and 28$^a$ of the transfer switch through resistance $r^a$ and the right hand pole 43$^a$ of switch 43 through armature "$a$" through resistance $r^7$ and the left hand pole 43$^b$ of switch 43 through contacts 34$^a$, 34, 34$^b$ and 33$^c$ of the transfer switch to the right hand terminal of said generator. It should be noted that upon establishment of the aforedescribed connections for motor 41, contact 43$^c$ associated with switch 43 connects the field "$f$" across the terminal of the generator of set MG$^1$. Thus, the motor 41 will operate in a reverse direction at a speed which is less than its speed in a forward direction and assuming that the load on the distribution circuit remains below the value at which relay 46 responds the pilot switch PS will return to its normal position. Upon return of the pilot switch PS to normal position contact 38 disengages contact 38$^a$ to open switch 43 for stopping of motor 41 and if the motor generator set MG$^2$ is in operation the same is stopped by opening of switch 27 through disengagement of contact 40 from contact 40$^a$.

Assume now that the motor generator set MG$^2$ is in operation and that the transfer switch TS is moved into its lower position, relay 45 will then be controlled by contacts 7$^b$ of the circuit breaker 7 associated with starter S$^2$ and said relay and relay 46 will function to control the energizing circuit of switches 42 and 43 in the manner above-described to effect forward and reverse operations of the pilot motor 41. However, switches 42 and 43 will then be energized from the transformer T associated with starter S$^2$ and the pilot motor 41 will then be energized by current from the generator of the set MG$^2$. Circuit from transformer T of starter S$^2$ to the witches 42 and 43 is then established through contact 29$^c$ and 35$^c$ of the transfer switch and contacts 6$^c$ associated with the field switch of starter S$^2$ while the circuit from the terminals of the generator set MG$^1$ to pilot motor 41 is established through contacts 28$^c$ and 34$^c$ of said transfer switch. Also with the transfer switch in its lower position switch 27 serves to short-circuit the master switch 10 of starter S$^1$ by a circuit extending through contacts 30$^c$ and 31$^c$ of said transfer switch and switch 26 is supplied with current from the generator of set MG$^1$ by a circuit extending through contacts 32$^c$ and 33$^c$ of said transfer switch.

When either of the motor generator sets is in operation and the load thereon exceeds a predetermined value, the circuit breaker 7 associated therewith opens, and the contacts 7$^b$ thereof open the energizing circuit of relay 45. If the motor generator set MG$^1$ is in operation and the circuit breaker 7 associated therewith opens, relay 45 establishes an energizing circuit for switch 42 extending from the left hand terminal of the transformer T associated with the starter S$^1$ through contacts 29$^b$ 29 and 29$^a$ of the transfer switch through the contact arm and stationary contact 46$^a$ of relay 46 through the contact arm and stationary contact 45$^a$ of relay 45 through the operating winding of switch 42 through contacts 37$^a$, 37 to 36$^a$ of the pilot switch through contacts 35$^a$, 35 and 35$^b$ of the transfer switch and through contact 6$^c$ of the field switch of starter S$^1$ to the right hand terminal of the transformer. However, if the motor generator set MG$^2$ is in operation and the circuit breaker 7 associated therewith opens, relay 45 establishes an energizing circuit for switch 42 extending from the left hand terminal of the transformer T associated with starter S$^2$ through contacts 29$^c$, 29 and 29$^a$ of the transfer switch through the contact arm and stationary contact 46$^a$ of relay 46 through the contact arm and stationary contact 45$^a$ of relay 45 through the operating winding of switch 42 through contacts 37, 37$^a$ to contact 36$^a$ of the pilot switch through contacts 35$^a$, 35 and 35$^c$ of said transfer switch and thence through the auxiliary contact 6$^c$ of field switch 6 to the right hand terminal of transformer T.

As above set forth, closure of switch 42 effects forward operation of the pilot motor 41 which operation causes the switch 27 to close for automatic starting of the idle motor generator set. Thus it is apparent that when either of the motor generator sets is in operation and the circuit breaker 7 associated therewith opens the other motor generator set will be automatically started.

As above stated, an automatic reclosing circuit breaker CB is provided in the distribution circuit. As shown in Fig. 4 circuit breaker CB is provided with a closing coil 48 the energizing circuit of said coil being controlled by an overload relay 49 and an auxiliary switch 50. Overload relay 49 is responsive to load conditions in the distribution circuit while the switch 50 is biased to closed position and upon closure of the circuit breaker the same is moved to open position and is held therein by a latch 51. When switch 50 is in open position a resistance $r^s$ is included in the energizing circuit of the closing coil 48, said resistance being of such value that the same limits current to the operating coil to an amount just sufficient to hold the circuit breaker in closed position but insufficient to move the same from open position. Latch 51 is provided with a tripping coil 52, the energizing circuit of said coil being controlled by normally closed auxiliary switch 53. Switch 53 is adapted to open upon closure of the circuit breaker and upon opening of said circuit breaker the same moves to open position against the action of dash pot 54. The control means further includes resistances $r_9$ and $r^{10}$, said resistances being connected as shown in the drawing.

With the parts of the circuit breaker in the position shown in Fig. 4 it will be observed that if the current conditions in the distribution circuit are normal, tripping coil 52 will be energized by a circuit extending from point 55 in one of the lines through resistance $r^9$ through said tripping coil and through the auxiliary switch 53 to point 56 in the other line. Tripping coil 52 will thus release latch 51 for closure of switch 50 and said switch in closing excludes the resistance $r^8$. The operating coil 48 is then connected between points 55 and 56 and the circuit breaker will then close and will remain in closed position as long as the current conditions in the distribution circuit are normal. Upon voltage failure the winding 48 will be deenergized and the circuit breaker will reclose only after the dash pot retarded switch 53 returns to closed position. Upon overload conditions in the distribution circuit relay 49 opens to interrupt the energizing circuit of switch 48 and the tripping coil 52 will remain unresponsive until the current conditions in the distribution circuit return to normal. Assuming that the circuit breaker has been tripped and the parts are in the position shown in Fig. 4 it will be observed that when overload or short circuit exists in the distribution circuit DC, there are two paths whereby current may flow from the point 55 to the point 56 one of said paths being through the resistance $r^9$, coil 52 and switch 53 and the other being through the resistance $r^{10}$ and the load or short circuit on the distribution circuit. Coil 52 is wound with a low resistance so that a slight variation in the resistance of the load or short circuit on the distribution circuit will cause a corresponding change of current through said coil. Thus if the load or short circuit on the distribution circuit is of low resistance, a large part of the current will be shunted around the coil 52 but as soon as the short circuit is removed or the resistance of the circuit increased to a value which would not permit excessive current to flow were the breaker to reclose enough current will pass through the coil 52 to effect tripping of latch 51 for reclosure of the circuit breaker.

It will now be observed that upon tripping of either of the circuit breakers 7, the circuit breaker CB will open. As before stated, when either of the motor generator sets is in operation and its associated circuit breaker is tripped the other motor generator set will automatically start. The dash pot 54 of the circuit breaker CB is designed so as to prevent reclosure thereof for a time interval which is sufficient to bring the second motor generator set up to speed and to also permit the circuit breaker of the leading generator to reclose. Thus upon reclosure of circuit breaker CB the motor generator sets will be thrown in parallel across the distribution circuit. As long as the load in the distribution circuit is below a given value circuit breaker CB will remain in closed position but under abnormal load conditions the relay 49 will respond to effect opening thereof. However, the two motor generator sets will remain in operation and as soon as the load conditions in the distribution circuit return to normal the circuit breaker CB will reclose to reconnect the motor generator sets to the load.

As before stated, means is provided for connecting the fields of the two generators in parallel across the terminals of the leading generator. The fields are connected in this manner to maintain the fields of the leading generator and the idle generator at substantially the same heat to provide for equalization of the terminal voltage of the generators when the same are thrown in parallel across the distribution circuit. Further, it should be noted that upon failure of voltage in the supply circuit both of the automatic starters $S^1$ and $S^2$ will return to normal position and upon restoration of the voltage in said circuit the leading motor generator set will be brought up to speed prior to starting of the other motor generator set.

What I claim as new and desire to secure by Letters Patent is:

1. The combination with an alternating current supply circuit and a direct current distribution circuit, of a plurality of rotary transformer units to be connected in parallel between said circuits, automatic means for starting said units from said supply circuit subject to manual selection and for connecting the same upon starting thereof to said distribution circuit, and means for automatically starting and stopping either of said units while the other is in operation upon given load conditions in said distribution circuit, said latter means comprising means for varying the starting period of said former unit.

2. The combination with an alternating current supply circuit and a direct current distribution circuit of a plurality of rotary transformer units to be connected in parallel between said circuits, means for selectively starting said units from the former circuit and for connecting the same to said latter circuit upon starting thereof and automatic means adapted when either of said units is in operation to start the other of said units after a given period of time upon given load conditions in said distribution circuit and in a shorter period of time upon increased load conditions in said distribution circuit.

3. The combination with an alternating current supply circuit and a direct current distribution circuit of a plurality of rotary transformer units to be connected in parallel between said circuits, means for selectively starting said units from the former circuit and for connecting the same to said latter circuit upon starting thereof and automatic means adapted when either of said units is in operative to start the other of said units when the load on said former unit exceeds a given valve, said means being adapted to start said latter unit after a period of time varying inversely to the value of the load on said former unit.

4. The combination with an alternating current supply circuit and a direct current distribution circuit of a plurality of rotary transformer units to be connected in parallel between said circuits, separate automatic starters for said units, each adapted to start its respective unit from said supply circuit and each including an automatic reclosing overload circuit breaker for connecting its respective unit to said distribution circuit upon starting thereof and automatic means between said starters for automatically starting either of said units while the other is in operation, said means being adapted upon opening of the circuit breaker associated with either of said units to start the other of said units.

5. The combination with an alternating current supply circuit and direct current distribution circuit of a plurality of rotary transformer units to be connected in parallel between said circuits, an automatic starter for each of said units adapted to start the same from said former circuit and to connect the same to said latter circuit upon starting thereof, each of said starters being provided with a master switch for controlling the same and control means between said starters adapted when either of said units is in operation to shunt the master switch associated with the starter of the other of said units for starting of the latter upon given current conditions in said distribution circuit.

6. The combination with an alternating current supply circuit and a direct current distribution circuit of a plurality of rotary transformer units to be connected in parallel between said circuits, an automatic starter for each of said units for starting the same from said former circuit and for connecting the same to the latter upon starting thereof, each of said starters including a master switch for controlling the same, and means adapted when either of said units is in operation to start the other of the said units by shunting the master switch associated with the starter of the latter, said means being adapted to act after a given period of time upon given load conditions in said distribution circuit and in a shorter period of time upon predetermined increased load conditions in said circuit.

7. The combination with an alternating current supply circuit and a direct current distribution circuit of a plurality of rotary transformer units to be connected in parallel between said circuits, means for starting said units selectively from said former circuit and means adapted when either of said units is in operation to start the other of said units upon given load conditions in said distribution circuit, said means including a timing device adapted to act after a given interval upon predetermined load conditions in said distribution circuit and in a shorter interval upon predetermined increased load conditions in said circuit.

8. The combination with an alternating current supply circuit and a direct current distribution circuit of a plurality of motor generator sets to be connected in parallel between said circuits, the generator of each of said sets having a shunt field winding, automatic means for starting said sets from said supply circuit subject to manual selection and for connecting the same upon starting thereof to said distribution circuit, means associated with said former means for automatically starting and stopping either of said sets, while the other is in operation, upon given load conditions in said distribution circuit and means for connecting the shunt field of the generator of either of said sets in parallel with the shunt field of the generator of the other of said sets while the latter set is in operation to render the voltage of the former set upon starting thereof substantially the same as the voltage of the latter set.

9. The combination with an alternating current supply circuit and a direct current distribution circuit of a plurality of motor generator sets to be connected in parallel between said circuits, the generator of each of said sets being provided with a shunt field winding, a regulating rheostat in the shunt field circuit of the generator of each of said sets, means for starting said sets from said supply circuit subject to manual selection and for connecting the same upon starting thereof to said distribution circuit, switches associated with said former means for excluding said rheostats from the shunt field circuits of the generators during starting of said sets, and means associated with said former means for automatically starting and stopping either of said sets while the other is in operation, upon given load conditions in said distribution circuit.

10. The combination with an alternating current supply circuit and a direct current distribution circuit of a plurality of rotary transformer units to be connected in parallel between said circuits, separate automatic starters for said units, means associated with said starters for automatically starting and stopping either of said units while the other is in operation upon given load conditions in said distribution circuit, said latter means being adapted upon failure of voltage in said supply circuit to insure against starting of both of said motor generator sets upon restoration of voltage in said circuit.

11. The combination with an alternating current supply circuit and a direct current distribution circuit of a plurality of rotary transformer units to be connected in parallel between said circuits, separate automatic starters for said units adapted to start the same from said former circuit and to connect the same to said latter circuit upon starting thereof and means associated with said starters for automatically starting and stopping either of said units while the other is in operation upon given load conditions in said distribution circuit, said latter means including a motor operated timing device adapted to start the former unit in a given period upon given load conditions in said distribution circuit and in a shorter period upon increased load conditions in said distribution circuit.

12. The combination with an alternating current supply circuit and a direct current distribution circuit of a plurality of rotary transformer units to be connected in parallel between said circuits, separate automatic starters for said units each including a circuit breaker for connecting its respective unit to the distribution circuit upon starting thereof, said circuit breakers being adapted to open upon given load conditions on their respective units and being adapted to reclose automatically after a given period of time, means associated with said starters for automatically starting either of said units while the other is in operation upon opening of the circuit breaker associated with the latter unit, and a circuit breaker in said distribution circuit adapted to open upon opening of the circuit breaker associated with said latter unit and to reclose automatically after starting of said former unit.

In witness whereof, I have hereunto subscribed my name.

EDWIN W. SEEGER.